United States Patent [19]

Brouwer

[11] 4,099,877
[45] Jul. 11, 1978

[54] LENS TESTING METHOD AND APPARATUS

[75] Inventor: Willem Brouwer, Lexington, Mass.

[73] Assignee: Coulter Information Systems, Inc., Bedford, Mass.

[21] Appl. No.: 732,044

[22] Filed: Oct. 13, 1976

[51] Int. Cl.² .............................................. G01B 9/00
[52] U.S. Cl. .................................................. 356/124
[58] Field of Search ........................ 356/124, 125, 127

[56] References Cited

U.S. PATENT DOCUMENTS

| | | | |
|---|---|---|---|
| 3,193,690 | 7/1965 | Murata et al. | 356/124 |
| 3,250,177 | 5/1966 | Shack | 356/124 |
| 3,438,713 | 4/1969 | Heynacher et al. | 356/124 |
| 3,492,076 | 1/1970 | Back | 356/124 |
| 3,542,475 | 11/1970 | Cooper | 356/124 |

*Primary Examiner*—John K. Corbin
*Assistant Examiner*—R. A. Rosenberger
*Attorney, Agent, or Firm*—Silverman, Cass & Singer, Ltd.

[57] ABSTRACT

A lens testing method and apparatus is disclosed to test the transfer function of a lens at a multiple number of points in the lens and to locate the best focal plane and format position of the lens within the specified focal range of the lens. The lens is mounted in the lens tester between the object plane and the image plane. The object plane has a multiple number of beam forming apertures which are illuminated to project individual light images through the lens to respective targets or target segments in the image plane. The targets are a multiple number of apertures geometrically similar to the object aperture, having a fixed orientation to the object plane apertures. The target and object planes are moved relative to one another such that the individual light images are moved across the apertures of their corresponding targets. The light images passing through the target apertures are sensed to determine the transfer function of the lens at the respective points in the image plane. The lens may be rotated 90° to test the meridional and the sagittal transfer function of the lens at each point. In operating the lens tester, the lens is first moved to a suitable focal plane and the value of the transfer function at the desired points in the image are compared with a predetermined minimum acceptable values of the transfer function. If the value of the transfer function at any tested point in the lens falls below the minimum acceptable value, the lens is moved to another suitable focal plane and again tested. Once all the points in the lens test above the minimum value of the transfer function for each respective point, the total of the transfer functions for each format position is determined by rotating the lens and testing again. The one best format position and focal plane is then found by comparing the total value of the transfer function for each point in each suitable focal plane within the lens focal range with the total value of the previous best focal plane. The lens may be rotated any number of steps in each focal plane to test as many format positions around the lens as desired to determine the best format position in the best focal plane.

27 Claims, 7 Drawing Figures

LENS TESTING METHOD AND APPARATUS

BACKGROUND OF THE INVENTION

The invention relates to a lens tester for testing lenses and more particularly a lens tester which may easily test any number of desired points in the image plane a lens for the value of the transfer function at these points at all focal planes within the lens focal range and for any desired number of format positions in a focal plane to determine the one best focal plane in the focal range and the best format position in that focal plane.

Current interest in reproducing machinery such as xerography and photography has brought about a need for high resolution lenses to be used in such combinations and a method and apparatus for testing such lens. Previous lens testing systems have been developed; however, none of the previous testing systems have been able to test multiple points in a lens and multiple formats for the lens in the focal range of the lens.

The need has developed for a lens testing apparatus which may easily test any desired number of points in a lens image and determine the best focal plane in the focal range of the lens and the best format position in that focal plane of the lens during a single testing operation. This testing operation must be done quickly and efficiently since the combination of possible focal planes, points to be tested in the lens and format positions in each focal plane in the focal range of the lens is an extremely large number.

SUMMARY OF THE INVENTION

The above and other dsadvantages of prior art lens testing devices and techniques are overcome in accordance with the present invention by providing a lens tester which may test the value of the transfer function at any number of points in the image of a lens and which will find the one best focal plane and the best format position in that focal plane for each lens tested for a given focal range. The lens tester comprises an object plane with a plurality of beam forming apertures which are illuminated and focused through the lens to be tested onto a target in the image plane. The target has individual targets or target segments each of which has a second plurality of geometrically similar apertures which are greater than the number of the apertures in the object plane. The apertures in the target plane and the object plane are moved one with respect to the other to cause the individual light images projected onto the targets to pass over the apertures of the respective targets. The value of the transfer function at various desired points to be tested may be sensed by light sensing devices such as photo detectors. The lens may be rotated as desired to check any number of format positions in each focal plane.

DESCRIPTION OF THE PREFERRED EMBODIMENT

As indicated above, the invention is concerned with a lens tester for testing lenses at a multiple number of points in the lens to determine the best focal plane and best format position of the lens within the lens focal range. It should be kept in mind that the operation of the invention may be carried out by mechanical expedients other than the specific one described hereinafter. The specific apparatus illustrated is one preferred embodiment of the invention and serves to illustrate the operation of the invention.

Figure 1:
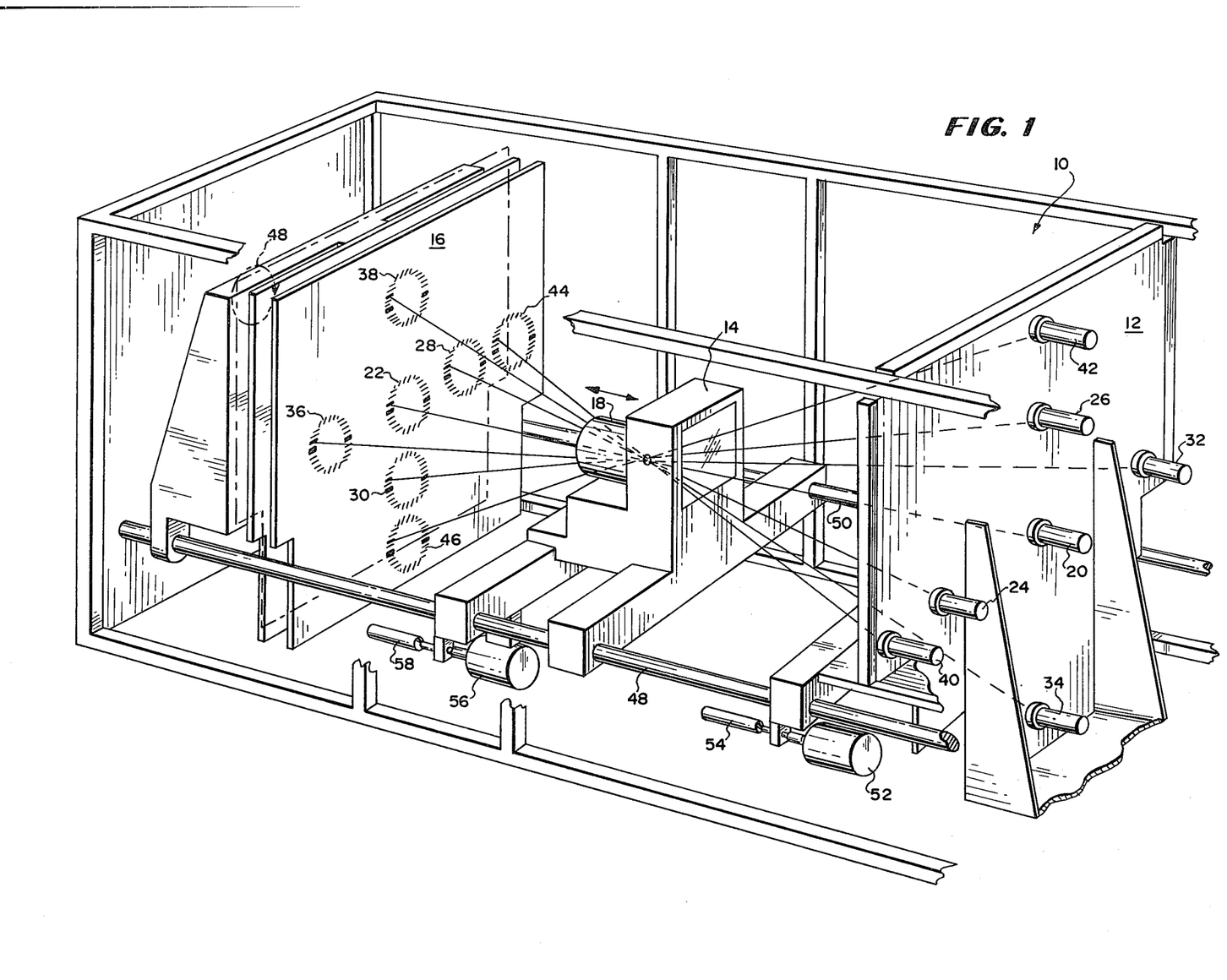
FIG. 1 is a perspective view of the lens tester partially illustrated.

Referring now to FIG. 1, the lens tester of the invention is indicated generally at 10. The lens tester consists of three major elements, an aperture mounting structure 12 in the object plane, a lens mounting station 14, and a target mounting member 16 in the image plane.

A lens 18 to be tested, first is mounted in the lens mounting station 14. The lens tester 10 has been illustrated in a skeletal fashion for ease of explanation; however, the lens 18 would generally be tested in a totally enclosed or otherwise dark area to avoid stray light interferring with the testing.

The aperture mounting structure 12 has independent light sources of any suitable commercial type mounted on it which are aligned with individual beam forming apertures in the aperture mounting structure 12, which form images through the lens 18 on individual targets or target segments on the target mounting member 16. A first light source 20 is aligned on the axis of the lens 18 with a first target or target segment 22 which has a plurality of apertures of generally geometrically similar configurations. This light source 20 and target 22 are sufficient to test the axis point of the lens. For illustration purposes only, three other points of the lens 20 may be tested. The apertures in the structure 12 and member 16 preferably are slits aligned parallel with one another; however, other predetermined configurations could be used within the scope of the invention.

The other points of the lens 18 to be tested are chosen either by testing the lens specification at given distances from the axis as determined by the manufacturer, or alternately, having a lens manufactured to meet certain specifications at particular distances from the axis. In either case, the other points are chosen to be substantially equal to their required testing distance or angle from the lens axis. A typical lens specification includes a minimum value of the transfer function received through a specified number of line pairs per unit distance at a particular angle or distance from the axis of the lens. A typical specification for one point in a lens for example, is a 0.2 minimum value of the transfer function, at 20 line pairs per millimeter, at 120 millimeters from the axis of the lens. Similar sets of figures are given for the other points to be tested.

The second lens image point is tested by a first pair of light sources 24, 26 which are aligned with a first pair of targets or target segments 28, 30. Each of these light sources 24, 26 and targets 28, 30 are located the same distance from the axis. Each of the sources 24, 26 and each of the targets 28, 30 are also spaced 90° apart from one another.

In a like manner the third and fourth lens points are tested by a second pair 32, 34, and a third pair 36, 38 of light sources aligned with a second pair 40, 42, and a third pair 44, 46 of targets or target segments, respectively. Each of the points tested are a different angular distance from the axis of the lens 20.

Figure 5:
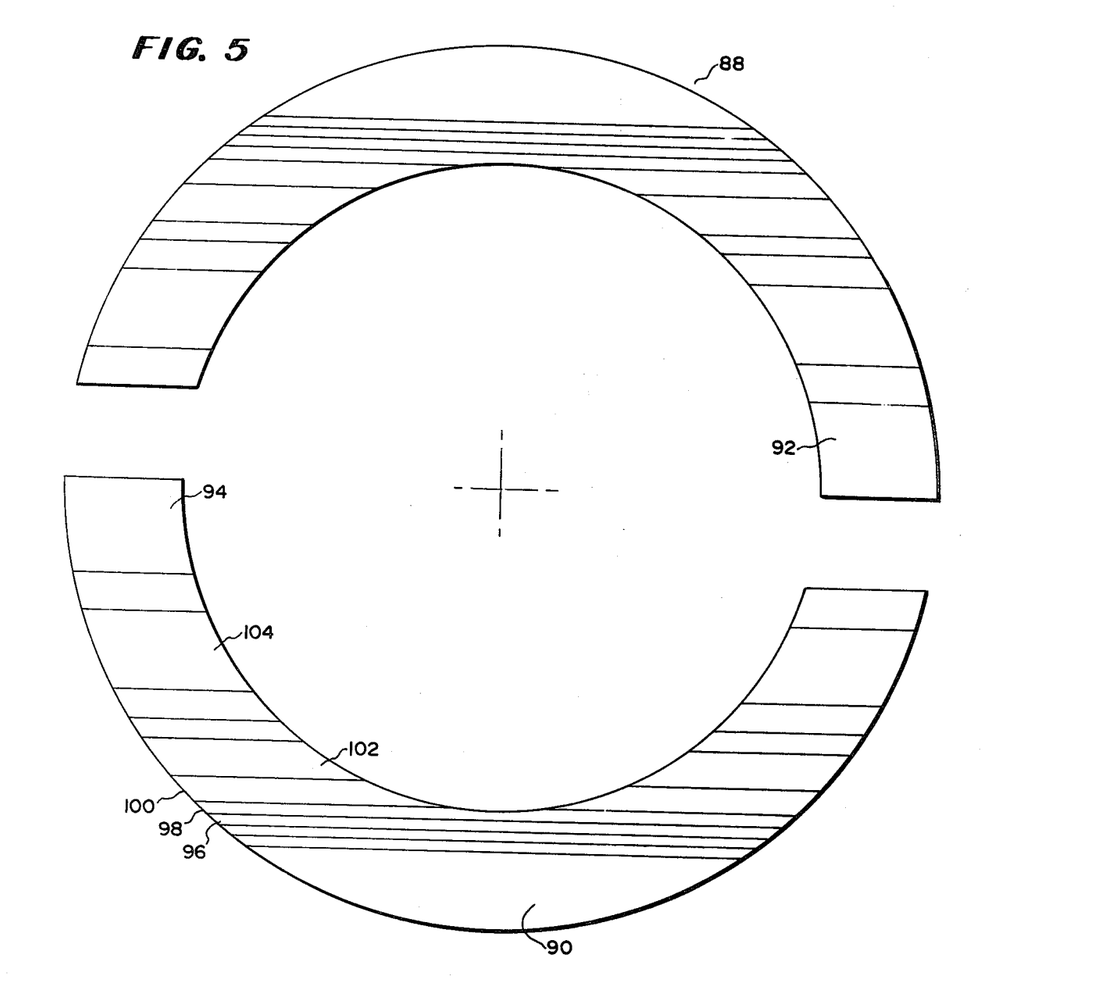
FIG. 5 is an enlarged plan view of one of the individual targets of the lens tester.
Figure 6:
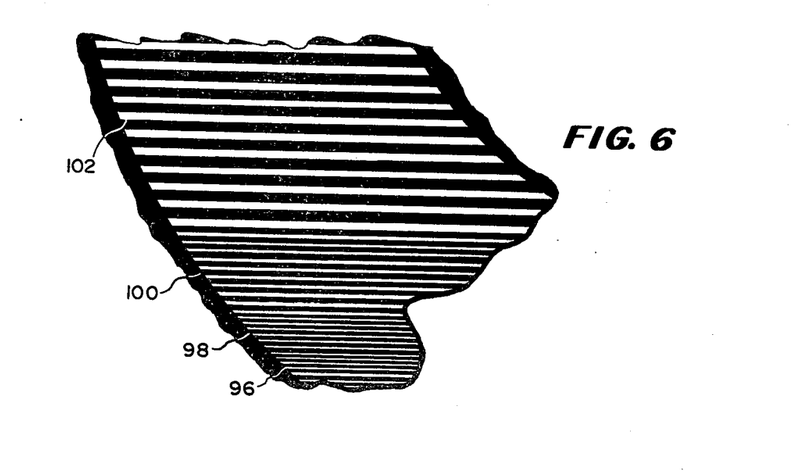
FIG. 6 is an enlarged view of a fragmentary portion of the target of FIG. 5.

The target mounting member 16 rotates as indicated at 48 on a radius which is chosen equal to the radii of the individual targets or target segments. The individual target slits are arranged in line pairs around the periphery of each target (FIGS. 5 and 6). The target slits and light source slits are oriented so that they are parallel at all times. The individual light images from the respective light sources pass through the target slits to be sensed by individual photosensing means (FIG. 2) of any suitable commercial type.

The aperture mounting structure 12 and the lens mounting station 14 are mounted on a pair of transport rails 48, 50. The structure 12 is moved along the transport rails 48, 50 by a first stepping motor 52. The length of each step of the stepping motor 52 may be set by a first adjustable caliper device 54 as desired. The lens mounting station 14 is also moved along the transport rails 48, 50 by a second stepping motor 56 which is controlled by a second adjustable caliper device 58.

In operation, as previously noted, the lens 18 is mounted in the mounting station 14, which is moved to one end of the focal range of the lens 18 which is set by the manufacturer or requested by the buyer. The target mounting member 16 is moving such that the target apertures are maintained in the same orientation at all times and the lens is imaging each slit on its respective target.

For convenience, target 22 is used as a counter. Each of the targets has an identical configuration with a predetermined number of line pairs arranged in segments with a different number of line pairs per unit distance in each segment. The number of segments and spacing of the line pairs is merely one of choice determined by the quality as noted by the specification of the lens itself. The targets are preferably symmetrical; however, they would not have to be.

The sensing means behind target 22 actually does the counting and it may count from a gray area (FIG. 6) or by timing or from some predetermined starting location on the initiation of each rotation. The sensing means generate electric signals as the light image passes through each target slit and the signals are counted by any convenient means. If the sensing means counts the same number of slits as the individual target 22 contains, or a predetermined percentage thereof, the lens tester determines it is in a suitable focal plane.

It will be appreciated that a perfect lens would have one finite focal plane; however, in testing the lens there is actually a range of focal planes. The lens tester starts at one end of the focal range set by the manufacturer or requested by the buyer and steps through the focal range to find the best focal plane and the best format position of the lens in that focal plane.

Once a suitable focal plane has been located the lens mounting station 14 is moved independently by the stepping motor 46 to a predetermined magnification in the focal plane. A convenient choice of magnification is 1 to 1, but variations thereof may be chosen if desired. For a 1 to 1 magnification the light sources and their respective targets are physically positioned an equal distance from the lens axis so that the intensity sensed at any chosen slit on two respective targets will be attained at the same time if the magnification is precisely 1 to 1. By moving the lens 18 back and forth with the stepping motor 46 the two slits will at one location attain the peak or some other predetermined intensity point of the individual light images passed through the two slits at the same moment, indicating that there is 1 to 1 magnification. The spacing of the light sources and their respective targets from the lens axis will be changed if a magnification other than 1 to 1 is desired.

The target 22 is then used as a counter and the prescribed specification of the lens is checked at the second point utilizing targets 28 and 30 and their respective sensing means. The value of the transfer function is determined by the formula $$T = \frac{V_{max} - V_{min}}{V_{max} + V_{min}}.$$

The maximum value of T for a lens is determined by measuring $V_{max}$ at a large slit or opening in the target and measuring $V_{min}$ at a large blocked area. The maximum value is then used as one. The test point is then measured by the average received intensity of the sensing means over the desired line pairs per unit length of the target at the proper angular distance from the axis, which will be some fraction of the maximum value as previously discussed.

If the value of the transfer function at target 28 is below the minimum value then stepping motors 52 and 56 are energized to move the aperture mounting structure 12 and the lens mounting station 14 to a new focal plane. The testing is then repeated. For a magnification of 1 to 1 stepping motor 52 will be set by the caliper device 54 to move twice the distance that the lens mounting station 14 moves which is set by the caliper device 58 and the stepping motor 56. The distance moved is set by the number of possible focal planes in the focal range which are desired to be tested.

Assuming, then that the value of the transfer function at the target 28 is above the minimum acceptable, then the value of the transfer function is similarly checked at each of the other respective targets. Again, if any one of the values of the transfer function is below the minimum acceptable this focal plane is rejected. Once, all the targets have a value for the transfer function, for their respective line pairs, which is above the minimum value, then the particular focal plane has passed in the first lens format position.

Typically, the points will be tested for an increasing coarseness in the line pairs the farther the distance from the axis. For instance, the second point, targets 28, 30, may be testing 50 line pairs per millimeter; the third point, targets 36, 38 may be testing 20 line pairs per millimeter; while the fourth point, targets 44, 46, may be testing only five lines per millimeter. Again, the particular number of line pairs per unit length is determined entirely by the quality or resolution of the lens itself.

Other orientations of target pairs may be chosen; however, two targets such as targets 28 and 30, 90° apart are particularly useful for testing a point in the lens. A first point in the lens is tested with the light image corresponding to target 28 with the slit horizontal, or intersecting the axis of the lens to measure the meridional resolution of the lens at target 28. At the same time a second point 90° away and at the same radius of the lens is being tested for the sagittal resolving power on the target 30 where the slit is still horizontal, but is now perpendicular to the axis of the lens. To measure the sagittal resolving power of the first point the lens is rotated 90° clockwise so that first point is now tested on target number 30. The value of the transfer function of a particular point in the lens thus may be either the meridional or the sagittal or as more commonly used, an average of the two, meridional and sagittal. The lens may be rotated in a like manner to test any number of formats for the meridional and sagittal resolution of each point in the lens.

Once, all the desired format positions of the lens are tested for each of the points and each point has proven to have a value for the transfer function above the minimum, the values for each format position may be summed to give one total value. Due to the minor imperfections in the lens there will result one format position where the lens has a better total resolving power as determined by the number of points tested at that format position in the focal plane.

This best format position in each focal plane is retained as is the total value of the transfer function for all points and formats in such focal plane and the other focal planes of the lens in the focal range are then tested to determine the one best focal plane and the best format position in that focal plane. The testing is then complete and the best focal plane with the best format position in that plane is retained. This typically, will be designated as a particular number of degrees rotation of the lens with a particular distance from the object plane to the target plane and a particular distance of the object plane to the lens, which precisely locates the best focal plane and format position.

If it was so desired, each focal plane and each value of the transfer function at each format position of the lens at each point tested, could be retained and recorded. For instance, this could be useful in manufacturing the lenses to indicate the particular points where the lens fails and the over-all resolution range of the lens throughout the focusing range of the lens. This also could be useful in pointing out points in the lens which failed when other points in a particular focal plane did not fail to correct the manufacturing of the lens.

Figure 2:
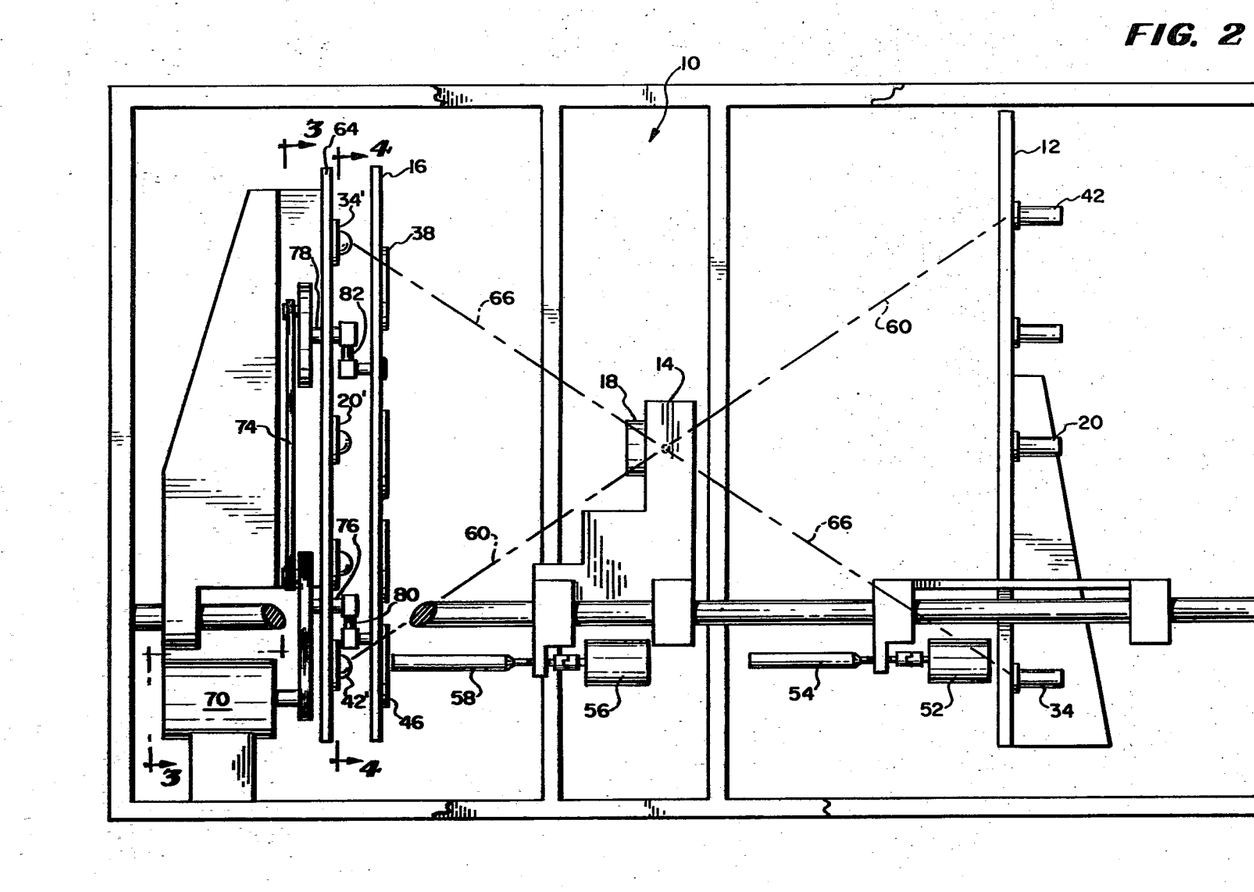
FIG. 2 is a side view of the lens tester.

Referring now to FIG. 2, a side view of the lens tester 10 is illustrated showing the sensing means behind the target mounting member 16 as well as the rotating drive for the target member 16. The individual light image from light source 42 is focused through the lens 18 and through the slits in its respective target 46 as shown by a dashed line 60. The slit image is focused onto a photo detector 42' which is mounted in a stationery plane 64. Each of the respective targets has a similar photo detector located behind the target. The light source 34 is focused through the slits in its target 38 as shown by a dashed line 66 focused on a photo detector 34'.

The target member 16 is rotated by a drive motor 70 which is coupled via a belt 72 and a connecting rod 74 or other conventional drive gearing to respective drive shafts 76 and 78. The respective drive shafts 76 and 78 drive eccentrics 80 and 82, respectively. The eccentrics 80 and 82 are chosen such that the radius of rotation of the targets member is equal to the radii of the respective targets. In this manner, each of the respective slits is focused on the same point in its respective target at the same instant of rotation.

Figure 3:
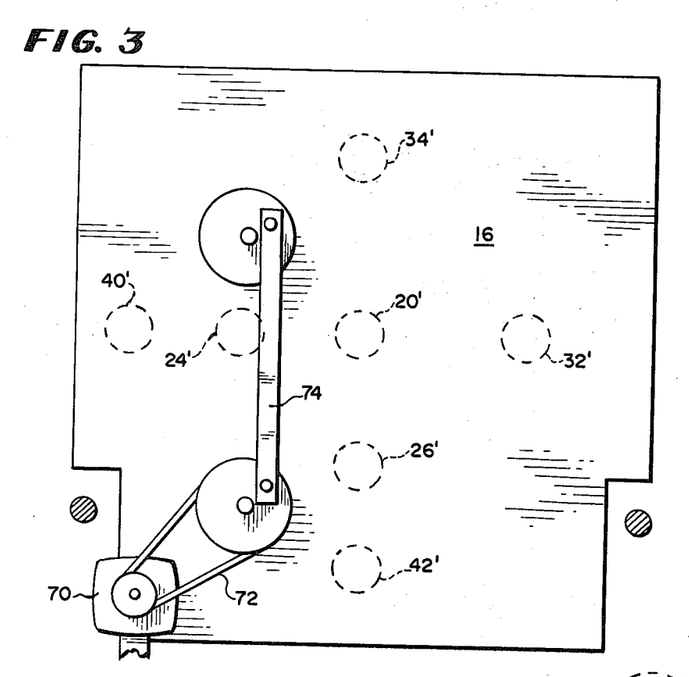
FIG. 3 is an end view of the lens tester taken along line 3—3 of FIG. 2.
Figure 4:
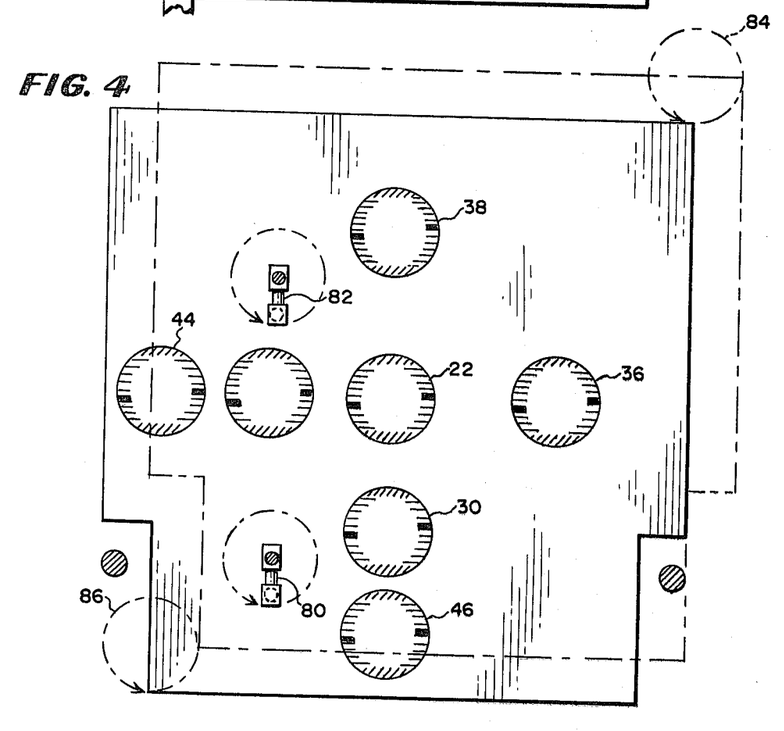
FIG. 4 is a sectional end view of the lens tester taken along line 4—4 of FIG. 2.

The rotation of the target member 16 and the connections of the drive motor 70, the belt 72 and the connecting rod 74 as well as the eccentrics 80 and 82 are best seen in FIGS. 3 and 4. Each point on the target 16 describes a radius as shown by the phantom circles 84 and 86, the radius of which is chosen to be equal to the radii of the targets. In this manner the slit image is passed over each line pair of each target in a symmetrical fashion. The photo sensors for the respective light sources are indicated with the same numerals primed.

The individual targets best are illustrated in FIGS. 5 and 6. Each of the targets is identical, and preferably symmetrical, but not necessarily so. As illustrated in FIG. 5, the target is oriented horizontally, but this is not of critical importance as long as the slits on the target are parallel to the slits in the object plane. The number of line pair segments in a target is again a function of the resolution of the lens and the number of points to be checked in the lens.

FIG. 5 illustrates a target which has a multiple number of line segments which may be arranged in segments from 5 line pairs per millimeter to the very fine lines segments of 66 line pairs per millimeter as desired to test. This target is a all purpose target including all types of line segments. In actuality, as previously discussed there may be only three different line segments containing for example, line pairs of 5, 20, and 50 line pairs per millimeter. The length of each line segment is not critical; however, there must be a sufficient number of line pairs to determine an average value of the transfer function in that segment before the light image passes into the next segment.

The target is drawn with two symmetrical halves; however, this is also not critical and there may be more or less depending upon the resolution of the lens to be tested. In this case, there are two gray areas 88, 90 which are utilized in target 22 as a reference for the lens tester to start a new count. A gray area is typically formed by slits at a 45 degree angle to the horizontal to form a gray area or area of no light modulations on the corresponding photo detector so that no electric signals are generated by the detector. In the first focal plane tested, after the lens tester has determined it is in a gray area by not receiving any signals, the counter will be reset and start counting signals from the detector; however, it may be entirely out of focus and not actually be in a gray area. The lens tester then counts the number of target slits the image passes through with a sufficient intensity to cause a modulation in the detector. This is compared to the actual number of target slits, or a predetermined percentage thereof, to determine if a proper focal plane has been located.

If the proper number of slits are counted the lens tester will then move the lens 18 to find the proper magnification using the two large slits 92 and 94. The two large slits 92 and 94 allow the maximum intensity of light to pass to the photo detector for the respective target.

To determine when the lens has moved to a position of 1 to 1 magnification, two targets along a radius from the axis of the lens 18 are monitored for the intensity of the image received through the large slit 92 and 94. For instance, this could be target 22 and target 38 and when the lens has been moved such that the maximum intensity or some other predetermined point of the intensity in the large slit 92 is found simultaneously in the two targets 22 and 38, the lens is then in 1 to 1 magnification in the particular focal plane as previously discussed. The step of finding a magnification is not necessary if only one point in the lens 18 is desired to be tested or if the target slit patterns are sufficiently course.

As previously described, the sensing means for the target 22 will now be used as a clock to test each of the points in the lens. As can be more clearly seen in FIG. 6, the segment 96 closest to the gray area 90 has the finest lines or the greatest number of line pairs per millimeter which increases as the segments increase in distance from the gray area 90 as seen by segments 98, 100 and 102. Again, this is not critical; however, by having the most fine line pairs closest to the vertical in this orientation, the bandwidth of the electrical response is decreased; because the slit image is passing over the gray area the slowest and is then passing over the large slits 92 and 94 the fastest as it is traversing the target.

For example, the segment 96 may be 50 line pairs per millimeter, the segment 98 may be 30 line pairs per millimeter, the segment 100 may be 20 line pairs per millimeter, the segment 102 may be 10 line pairs per millimeter and a segment 104 may be 5 line pairs per millimeter. The photo detector 20' corresponding to target 22 is used as a clock and assuming that the value of the transfer function is being determined at the three points previously described corresponding to 50 lines per millimeter, 20 lines per millimeter and 5 lines per millimeter; the value of the transfer function at targets 28 and 30 will be measured when the light image is passing over the segment 96. If the value of the transfer function is above the minimum desired then the value of the transfer function at targets 36 and 38 will be measured when the light image is passing over the segment 100, and if the value of the transfer function is above the minimum at this point then the value of the transfer function will be measured at targets 44 and 46 when the light image is passing over segment 104. If all the points have a value for the transfer function above the minimum acceptable value, then the lens will be rotated to the next format position, while it is in the same focal plane to test the next format position until all the format positions have been tested in the focal plane. The lens mounting station 14 and the aperture mounting structure 12 are then stepped to the next focal plane and the same testing procedure is repeated.

The lens 18 may be manually rotated in the lens mounting station 14 or may be connected to a stepping motor to rotate the lens to a new format position as desired. Again, depending upon the quality and resolution, the lens could be tested at four format positions 90° apart or more frequently as desired.

The rotation of the target mounting member 16 could be reversed with the aperture mounting structure 12 rotating and the target member 16 fixed. This incurs some disadvantages, in that the individual photosensing means would have to be larger to sense the whole target area, or the sensing means themselves also would have to be rotated to maintain their alignment with the light images.

Additionally, although the lens tester 10 has been described moving the light images over the line pair segments in a rotational fashion, the target member 16 or the aperture mounting structure 12 could be moved up and down or back and forth depending upon the orientation of the slits, with the targets or target segments being vertically or horizontally aligned. Again, the counting could be done with gray areas or by timing.

The measuring of the value of the transfer function for the meridional and the sagittal resolving power of a point in the lens was described utilizing a single horizontal slit with a target having corresponding horizontal slits arranged in line pair segments. An alternate method of measuring the meridional and the sagittal resolution of the lens at a particular point is to include a second slit perpendicular to the first slit located as close as feasible to the first slit. For example, in FIG. 2 utilizing light source 42 and its respective target 46, this would involve a second light source (not shown) placed just below the light source 42 with its aperture or slit perpendicular to the horizontal slit in light source 42. This would require a second offset target (not shown) overlapping target 46 with its slits perpendicular to the slits of target 46. Due to the closeness of these two perpendicular light images only one of the slits would be utilized at a time. A second photosensing means could be utilized or if the photo detector 42' was large enough it could be used for both targets. In this case the lens would not have to be rotated 90°, but would have the meridional and sagittal resolution determined almost simultaneously in each format position.

Figure 7:
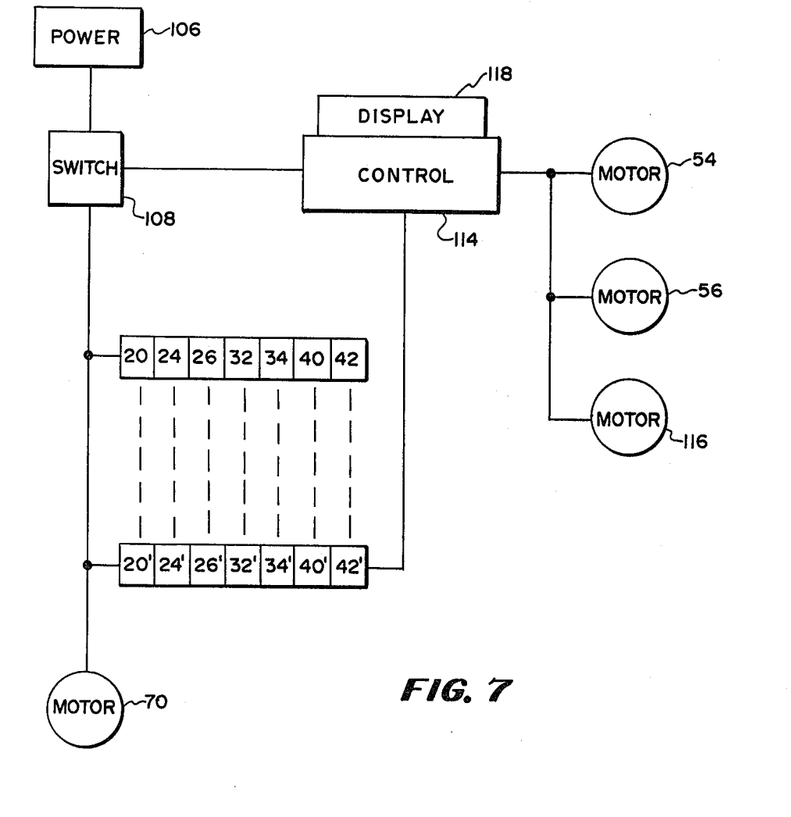
FIG. 7 is a block diagram of an automatic control for the lens tester.

Referring now to FIG. 7, an automatic control for the lens tester is illustrated. The lens tester may be manually controlled, but the operation is of course much faster if the various steps are automated.

Electric power is supplied by any convenient power source 106. A main switch 108 is turned on when a lens 18 to be tested has been mounted in the lens holder 14. The switch 108 immediately energizes the drive motor 70 to start the targets rotating, the individual light sources 20, 24, 26, 32, 34, 40 and 42 shown in an array 110 immediately project their individual light beams through the lens 18 and their respective targets to their individual photo detectors 20', 24', 26', 32', 34', 40' and 42' shown in an array 112, respectively.

An automatic control 114 is also energized. The control 114 controls the testing of the lens and contains memory devices, comparator and clock circuits to control the operation of the lens tester as previously described. The control 114 may be any type of suitable commercial control or components to provide the necessary control functions of the lens tester.

The control 114 will provide the gating and timing pulses to sequentially test the lens 18 throughout the lens focal range. A motor 116 may be connected to rotate the lens 18 to the new format positions in each focal plane.

The control 114 would sense the signals generated by the individual photo detector and would determine the value of the transfer function at each point tested. The control would control the motors 54 and 56 to move the lens 18 to a new focal plane and to obtain the proper magnification in each focal plane. The control would have a memory to retain the values of the transfer function and a display 118 to display the final best focal plane and format position of the lens 18. The display may also be utilized to display every value ascertained in every focal plane and format position as well as the meridional and sagittal resolution at each point tested.

As previously mentioned, only four test points in a lens have been described, but the tester of the invention may easily be utilized to test more or less points at any desired location in the lens.

Many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A method of testing a lens of a type normally having an indefinite number of focal planes within a specified focal range including the steps of:

A. projecting individual light images from a first plurality of apertures in an aperture mounting structure through said lens toward a plurality of targets carried on a target mounting member, each target having a second plurality of apertures whose configurations are all generally geometrically similar to the configurations of said first plurality of apertures and the number of apertures of the second plurality being substantially greater than the number of the first plurality, B. moving the mounting structure and target mounting member with respect to one another to cause individual light images from said first plurality of apertures to traverse the plurality of apertures of individual targets, respectively, C. detecting the light passing through the targets and generating electric signals responsive thereto, the number of signals for any target being related to the number of target apertures traversed by the individual light images, D. locating an acceptable focal plane for said lens on the basis of detection of a predetermined number of signals generated from the passage of a single image through the apertures of a single target; and E. determining the value of the transfer function of said lens at a multiple number of points in said lens in said focal plane.

2. A method of testing as claimed in claim 1 in which the first plurality of apertures are individual slits and the second plurality of apertures are series of slits arranged in multiple line pairs substantially parallel with the first mentioned slits on each target, and in which the step of moving includes translation of one of said aperture mounting structure and target mounting member in a plane perpendicular to the lens axis.

3. A method of testing as claimed in claim 1 wherein said step of locating includes:
counting the signals generated from the passage of a single image through the apertures of a single target and comparing the number of signals counted with the number of said single target apertures over which said image is moved.

4. A method of testing as claimed in claim 3 wherein:
if said number of signals counted is not substantially equal to said number of single target apertures over which said image is passed;
moving said lens and said aperture mounting structure with respect to said target mounting member to find a new acceptable focal plane.

5. A method of testing as claimed in claim 1 wherein said step of determining includes:
sensing the intensity of said individual light images from the respective first plurality of apertures which are passed through said second plurality of apertures.

6. A method of testing as claimed in claim 5 wherein said step of sensing includes:
comparing said sensed intensity to a predetermined minimum acceptable intensity.

7. A method of testing as claimed in claim 6 wherein:
if said sensed intensity is less than said predetermined acceptable intensity;
moving said lens and said aperture mounting structure with respect to said target mounting member to find an acceptable new focal plane.

8. A method of testing as claimed in claim 1 further including:
finding the best focal plane of said lens by obtaining the value of the transfer function of said lens at all acceptable focal planes within said specified focal range and retaining the best value of the transfer function of said lens.

9. A method of testing as claimed in claim 1 wherein said step of determining includes:
rotating said lens to determine the value of said transfer function at a multiple number of format positions of said lens.

10. A method as claimed in claim 9 wherein said step of rotating includes:
rotating a point in said lens 90° and again determining the value of the transfer function to arrive at the meridional and the sagittal value of the transfer function for said point.

11. A method of testing as claimed in claim 1 further including:
locating the lens at a predetermined magnification in said focal plane by moving said lens until the individual light images simultaneously pass through the same oriented aperture in two separate targets substantially on a radius with said lens axis.

12. A method of testing as claimed in claim 1 wherein the step of projecting includes:
said first plurality of apertures are individual slits and said second number are slits arranged in multiple line pairs, said slits oriented such that they remain substantially parallel to one another;
said second slits are arranged substantially around the periphery of a circle; and
one of said aperture mounting structure and said target mounting member is rotated in a second circle having a radius equal to the radius of said first circle to cause said individual images to traverse said second plurality of apertures.

13. A method of testing as claimed in claim 1 in which:
the first plurality of apertures are individual slits and the second plurality of apertures are series of slits arranged in multiple line pairs substantially parallel with the first mentioned slits on each target, and in which the step of moving includes translation of one of said aperture mounting structure and target mounting member in a plane perpendicular to the lens axis;
said step of locating includes;
counting the signals generated from the passage of a single image through the slits of a single target and comparing the number of signals counted with the number of said single target slits over which said image is moved;
said step of determining includes;
sensing the intensity of said individual light images from the respective first plurality of slits which are passed through said second plurality of slits, and comparing said sensed intensity to a predetermined minimum acceptable intensity.

14. A lens tester for testing a lens of a type normally having an indefinite number of focal planes within a specified focal range comprising:
A. means for projecting individual light images from a first plurality of apertures in an aperture mounting structure through said lens toward a plurality of targets carried on a target mounting member, each target having a second plurality of apertures whose configurations are all generally geometrically similar to the configurations of said first plurality of apertures and the number of apertures of the second plurality being substantially greater than the number of the first plurality, B. means for moving the mounting structure and target mounting member with respect to one another to cause said individual light images from said first plurality of apertures to traverse the plurality of apertures of individual targets, respectively, C. means for detecting the light passing through the targets and means for generating electric signals responsive thereto, the number of signals for any target being related to the number of target apertures traversed by the individual light images, D. means for locating an acceptable focal plane for said lens on the basis of detection of a predetermined number of signals generated from the passage of a single image through the apertures of a single target; and E. means for determining the value of the transfer function of said lens at a multiple number of points in said lens in said focal plane.

15. A lens tester as claimed in claim 14 further including:
means for automatically controlling the sequence of testing said lens.

16. A lens tester as claimed in claim 14 in which:
said first plurality of apertures are individual slits and said second plurality of apertures are series of slits arranged in multiple line pairs on each target substantially parallel with the first mentioned slits; and
in which said moving means include means for translating of one of said aperture mounting structure and target mounting member in a plane perpendicular to the lens axis.

17. A lens tester as claimed in claim 14 wherein said locating means include:
means for counting the signals generated from the passage of a single image through the apertures of a single target and means for comparing the number of signals counted with the number of said single target apertures over which said image is moved.

18. A lens tester as claimed in claim 17 wherein:
if said number of signals counted is not substantially equal to said number of single target apertures over which said image is passed;
means for moving said lens and said aperture mounting structure with respect to said target mounting member to find a new acceptable focal plane.

19. A lens tester as claimed in claim 14 wherein said means for determining include:
means for sensing the intensity of said individual light images from the respective first plurality of apertures which are passed through said second plurality of apertures.

20. A lens tester as claimed in claim 19 wherein said means for sensing include:
comparing said sensed intensity to a predetermined minimum acceptable intensity.

21. A lens tester as claimed in claim 20 wherein:
if said sensed intensity is less than said predetermined acceptable intensity;
means for moving said lens and said aperture mounting structure with respect to said target mounting member to find an acceptable new focal plane.

22. A lens tester as claimed in claim 14 further including:
means for finding the best focal plane of said lens by obtaining the value of the transfer function of said lens at all acceptable focal planes within said specified focal range and means for retaining the best value of the transfer function of said lens.

23. A lens tester as claimed in claim 14 wherein said means for determining include:
means for rotating said lens to determine the value of said transfer function at a multiple number of format positions of said lens.

24. A lens tester as claimed in claim 23 wherein said means for rotating include:
means for rotating a point in said lens 90° and again determining the value of the transfer function to determine the meridional and the sagittal value of the transfer function for said point.

25. A lens tester as claimed in claim 14 further including:
means for locating the lens at a predetermined magnification in said focal plane by moving said lens until the individual light images simulatenously press through the same oriented aperture in two separate targets substantially on a radius with said lens axis.

26. A lens tester as claimed in claim 14 wherein the means for projecting include:
said first plurality of apertures are individual slits and said second number are slits arranged in multiple line pairs, said second slits are arranged substantially around the periphery of a circle;
means for orienting said slits such that they remain substantially parallel to one another;
means for rotating one of said aperture mounting structure and said target mounting member in a second circle having a radius equal to the radius of said first circle to cause said individual images to traverse said second plurality of apertures.

27. A lens tester as claimed in claim 14 in which:
the first plurality of apertures are individual slits and the second plurality of apertures are series of slits arranged in multiple line pairs substantially parallel with the first mentioned slits on each target, and in which the means for moving include means for translating one of said aperture mounting structure and target mounting member in a plane perpendicular to the lens axis;
said means for locating include;
means for counting the signals generated from the passage of a single image through the slits of a single target and means for comparing the number of signals counted with the number of said single target slits over which said image is moved;
said means for determining include;
means for sensing the intensity of said individual light images from the respective first plurality of slits which are passed through said second plurality of slits, and means for comparing said sensed intensity to a predetermined minimum acceptable intensity.

* * * * *